United States Patent [19]

Saget

[11] 4,361,490

[45] Nov. 30, 1982

[54] PROCESS FOR CENTRIFUGAL SEPARATION AND APPARATUS FOR CARRYING IT OUT, APPLICABLE TO A MIXTURE OF PHASES OF ANY STATES

[76] Inventor: Pierre Saget, 36 avenue de la Grande Armée, 75017 Paris, France

[21] Appl. No.: 199,863

[22] Filed: Oct. 23, 1980

[30] Foreign Application Priority Data

Oct. 31, 1979 [FR] France ........ 79 27079

[51] Int. Cl.³ ........ B01D 21/26

[52] U.S. Cl. ........ 210/787; 210/378; 210/381; 210/512.3; 55/1; 55/401; 55/406; 55/446; 209/144

[58] Field of Search ........ 55/400–409, 55/1, 394, 446; 209/144; 210/512.3, 787, 378, 381; 261/83, 84, 89

[56] References Cited

U.S. PATENT DOCUMENTS 1,523,611 1/1925 Ryding ........ 55/403

2,991,844 7/1961 Nomar ........ 55/403

FOREIGN PATENT DOCUMENTS

10901AD of 1908 United Kingdom ........ 261/89

14544AD of 1909 United Kingdom ........ 55/406

189657 12/1922 United Kingdom ........ 55/401

*Primary Examiner*—Bernard Nozick

[57] ABSTRACT

The invention relates to a process for centrifugal separation and to an apparatus for carrying it out, applicable to a mixture of phases of any states, said apparatus comprising, disposed coaxially and moved in rotation in a fixed enclosure, a fan adapted to create a depression upstream, a rotary distributor converting the pressure drop resulting from the action of the fan on the upstream pressure into a speed of rotation of the mixture added in the same direction to the positive speed of rotation of said distributor, and a rotor comprising elements for guiding running streams, trap elements which imprison still layers and pick up heavy particles, elements for conducting these latter.

22 Claims, 14 Drawing Figures

FIG. 7
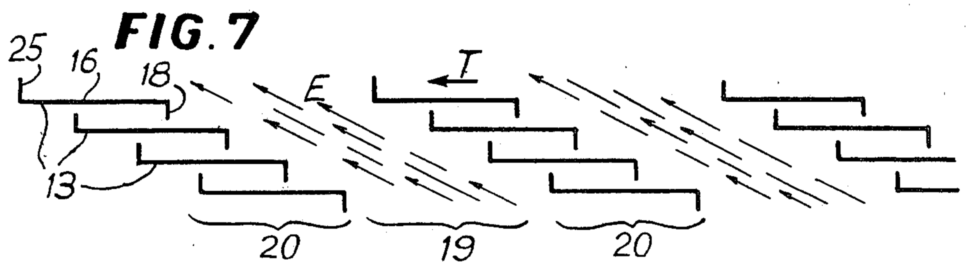
FIG. 8
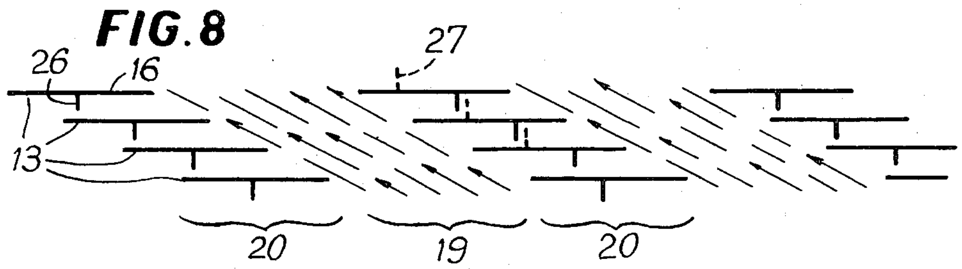
FIG. 9
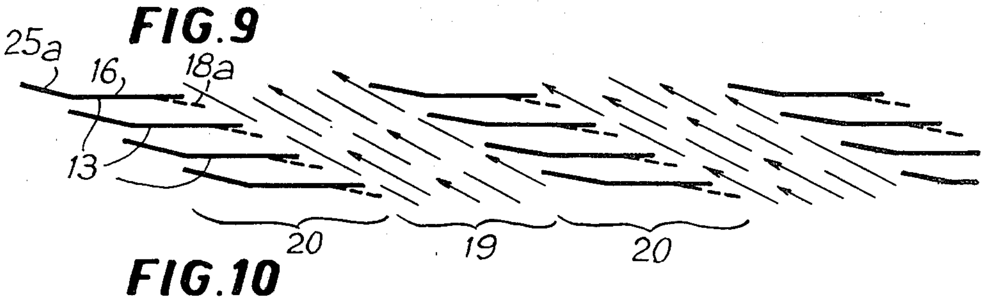
FIG. 10
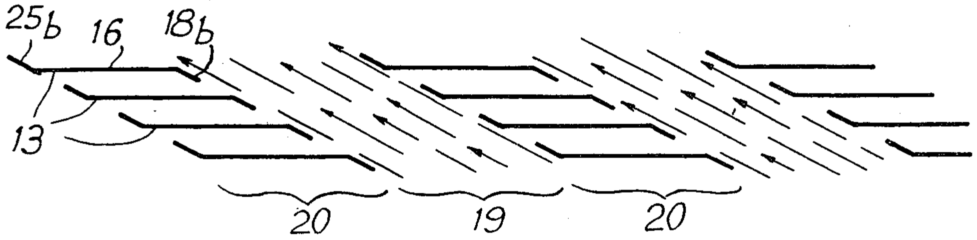
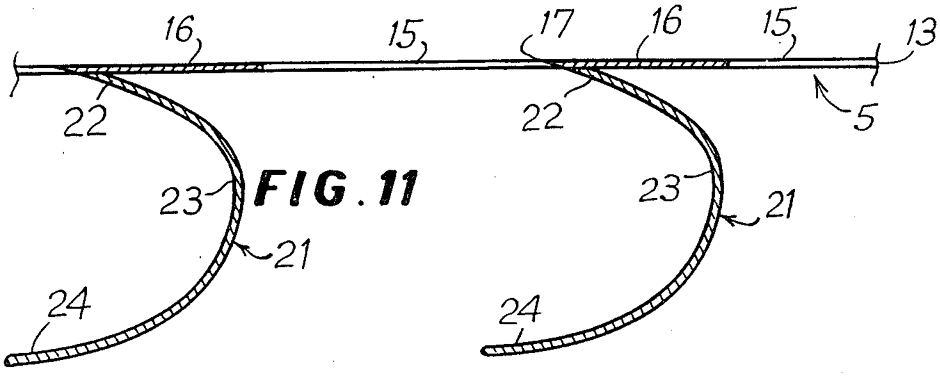
FIG. 11

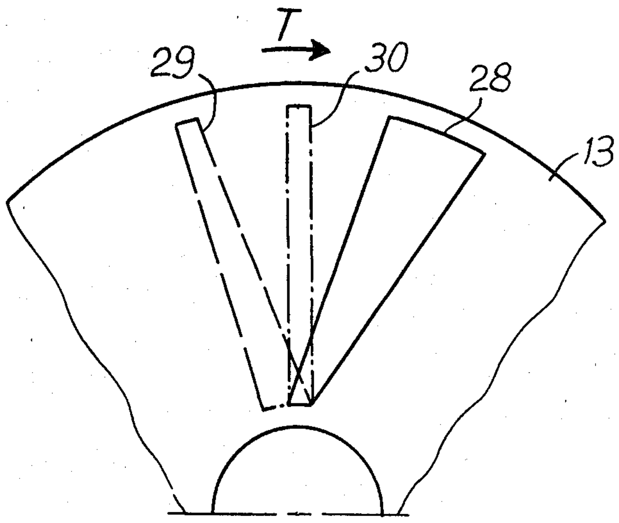
FIG. 13
FIG. 14
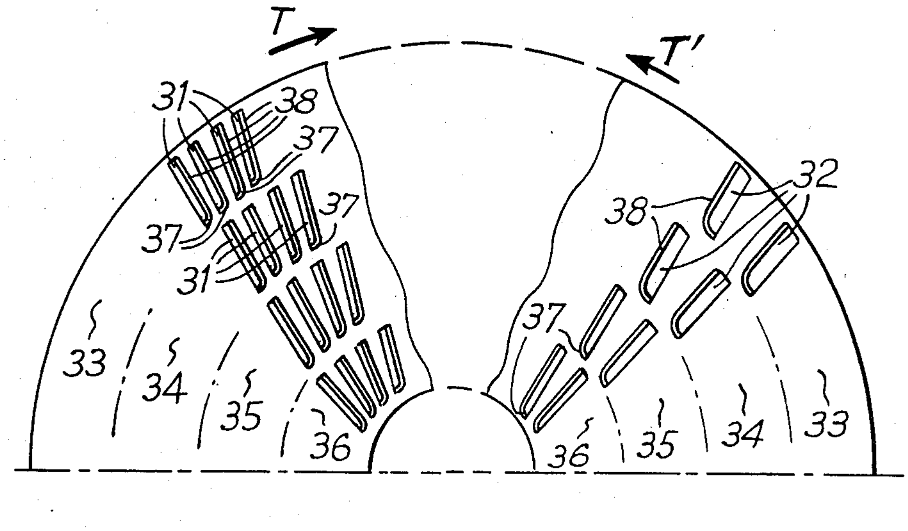

PROCESS FOR CENTRIFUGAL SEPARATION AND APPARATUS FOR CARRYING IT OUT, APPLICABLE TO A MIXTURE OF PHASES OF ANY STATES

The present invention relates to a process for the centrifugal separation of a mixture of phases of any states: gas in gas, liquid in gas, pulverulent solid in gas, liquid in liquid, pulverulent solid in liquid or other combinations of the three phases. It also relates to an apparatus for carrying out this process and, more especially, to a particular embodiment of said apparatus.

Its object is to create in the mixture an extremely intense centrifugal field which is much greater than the one to which a rotating element participating in the treatment is subjected. Consequently, manufacture of this rotating element is simplified and economical techniques not in common use in the domain of centrifugation may be employed, for example the moulding of rotating pieces of plastics material.

A further object of the invention is to obtain an excellent separation of the phases, even when their specific masses are very low and close to one another, as well as their perfect evacuation in separate phases out of the centrifugation zone.

Another object of the invention is to recover a considerable part of the kinetic energy of centrifugation, with a view to reducing the overall consumption of energy and thus to improve the economical yield of the treatment.

It further envisages creating, by thermodynamic effect, a cooling within the mass in movement, which may be beneficial, particularly for condensing a vapour phase.

The present invention proposes to this end a process for centrifugal separation, consisting in that:

- the mixture is rotated at an angular speed greater than that of a rotating element which this mixture must pass through,
- the mixture is divided into a plurality of streams flowing along helical paths through the rotating element and at an absolute tangential speed obviously higher than that of the latter,
- these running streams are separated by still, intermediate, helical, fluid layers held prisoner of this rotating element,
- the or each heavy phase ejected from the running streams by the centrifugal field thereof are trapped by the still layers,
- the or each heavy phase trapped in the still layer and subjected to the centrifugal field prevailing in the latter, obviously being less than the one established in the streams, is directed towards the periphery,
- and the or each heavy phase directed in the still layers are guided positively by said mobile element, Subsidiarily, the mixture is subjected, for its upstream rotation, on the one hand to the positive action of the rotating element and, on the other hand, to a downstream axial suction or to an upstream axial delivery through this element, the upstream drop in pressure which results therefrom being converted into a helical speed of which the tangential component is added to the tangential speed of said rotating element and of which the axial component creates the rate of flow.

In addition, the helical flow of the mixture is straightened downstream to be converted into an absolute axial flow and the kinetic energy of rotation of the treated mixture is recovered to rotate the rotating element and thus reduce the power consumed thereby.

The invention also relates to an apparatus for carrying out this process and comprising, disposed coaxially and moved in rotation in a fixed enclosure,

- a first device constituted by a fan, a compressor or pump, adapted to produce a depression upstream,
- a second device constituted by a rotating distributor converting the drop in pressure which results from the action of the first device on the upstream pressure into a speed of rotation of the mixture added in the same direction to the positive speed of rotation of said distributor,
- and a third device located downstream of the second and constituted by a rotor comprising elements for guiding the running streams which direct and channel the latter over at least a part of their path, trap elements which imprison the still, fluid layers and pick up the or each heavy phase, subsidiarily conducting elements which, whilst opposing the escape of the or each heavy phase towards the streams, participate positively in the guiding of the or each heavy phase towards the periphery.

Subsidiarily, the apparatus comprises, downstream of the third device or rotor, with respect to the flow of the mixture, a fourth device constituted by an action turbine whose section is adapted to this particular helical flow in order that the latter becomes substantially axial, the vanes also channeling the residual traces of heavy phase towards the periphery.

Moreover, at least certain of the abovementioned devices are coupled together and connected to a common device for driving them in rotation.

According to a particularly advantageously, but non-limiting embodiment, the third device, or rotor, comprises at least two coaxial plates of revolution, spaced apart from each other and defining openings which extend from the centre towards the periphery, are separated, for the same plate, by solid parts and, seen in plan view, are offset angularly from one plate to the following; according to the invention, the edges of the openings of the rotor strictly define the evelopes of the multiple running helical streams and, concomitantly, those of the still layers which separate them; the angular offset of the plates, the spaced-apart relationship thereof and the shape and size of the openings are chosen to determine with precision the relative inclination of said streams (i.e. their inclination relative to the rotor when it rotates) and thus the separating power and rate of flow of the apparatus; protuberant elements such as raised edges, ribs or the like, known per se, fastened with the solid parts, project exclusively in the still layers, on the one hand to trap the latter on the edge of the running streams and, on the other hand, to confine the or each heavy phase which escapes from the latter into said still layers and to guide it positively towards the periphery.

In this preferred embodiment, the second device, or rotary distributor, comprises at least two coaxial plates of revolution, spaced apart from each other and defining openings which extend from the centre to the periphery, are separated, for the same plate, by solid parts and, seen from plan view, are offset angularly from one plate to the following; according to the invention, these openings of the distributor are each bordered by a single raised edge or blade projecting on the upstream face of the adjacent solid part, with respect to the flow of the mixture, and to the rear, with respect to the rotation of the plates, or, in equivalence, of the downstream face and at the front.

The invention will be more readily understood on reading the following description with reference to the accompanying drawings, in which:

FIGS. 4 to 10 are sections taken concentrically with respect to the axis of rotation and developed flat, demonstrating the process of the invention for various embodiments of the rotor and sometimes of the rotary distributor.

FIGS. 11 and 12 are views similar to FIGS. 4 and 10, relating to particular embodiments of the rotary distributor and the action turbine, respectively.

FIGS. 13 and 14 are partial plan views of a plate, illustrating several possible forms of the openings.

Figure 1:
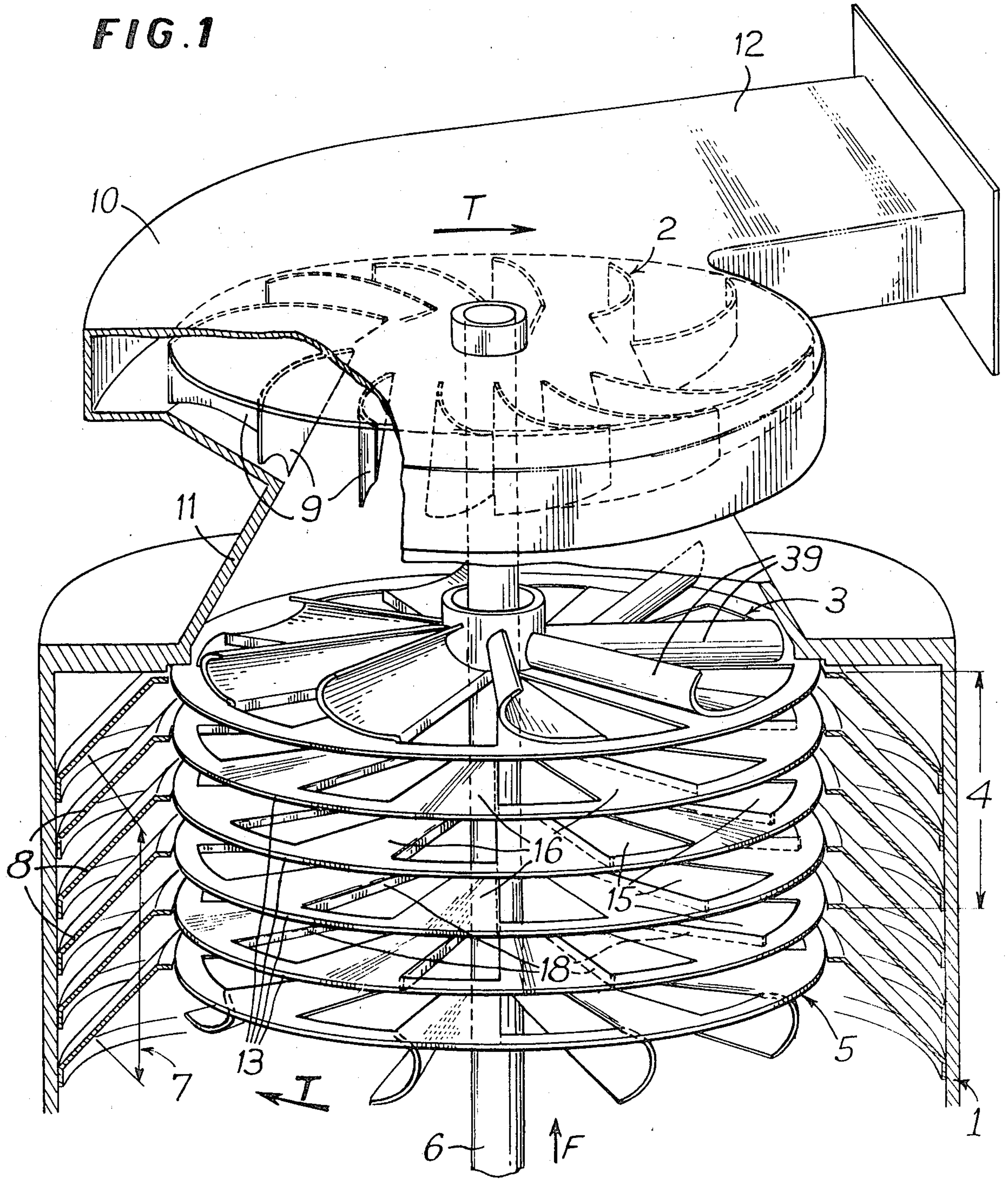
FIG. 1 is a perspective view with parts torn away, showing a first embodiment of the centrifugal apparatus according to the invention.

Referring now to the drawings, FIG. 1 shows the apparatus according to the invention which comprises a fixed enclosure 1 in which the following are disposed coaxially and moved in rotation, from downstream to upstream with respect to the direction indicated by the arrow F of the flow of the mixture to be treated:

a fan 2,
an action turbine 3,
a rotating element or rotor 4
a rotary distributor 5.

In the example shown, these devices 2 to 5 are moved positively and in synchronism; consequently, they are fixed on the same shaft 6 which may be coupled, at one end or at the other, to any device for rotating it, suitable for the running of the apparatus. This is not a necessary step, as it is quite possible to envisage rotating the fan 2 positively at a different but adapted speed; it is also possible to provide a positive drive for one or two devices only (the rotor 4 and the distributor 5 for example) and a floating assembly for the other or others (for example the action turbine 3).

Furthermore, the axis of rotation is vertical in the drawing, but it may also be horizontal or inclined.

The enclosure 1 contains a collecting element 7 which concentrically surrounds the rotating element 4 and possibly the distributor 5 to collect the or each heavy phase which arrives at the periphery. In the example shown, the element 7 is laminated and constituted by a stack of truncated rings 8 spaced apart from one another.

The fan 2 is intended to create a pressure drop upstream and a flow of mixture to be treated downstream, particularly through the rotating element. In the example shown, the fan is of the centrifugal type; its rotary blading 9 is suitably fixed to the drive shaft 6 and is housed in a casing 10 fixed to a convergent connection 11 of the body of the enclosure 1; the tangential pipe 12 of the casing enables the treated mixture, containing no heavy phase, to be evacuated.

It is obvious that the fan may be of another type, axial in particular, and that it may be replaced by a compressor disposed upstream; similarly, if the mixture, instead of being gaseous, is liquid, a suction or delivery pump may be used.

The upstream drop in pressure which results from the downstream axial suction or the upstream axial delivery, is converted by the rotary distributor 5 into a helical speed of which the tangential component is added to the tangential speed of the rotor and of which the axial component creates the rate of flow.

Figure 2:
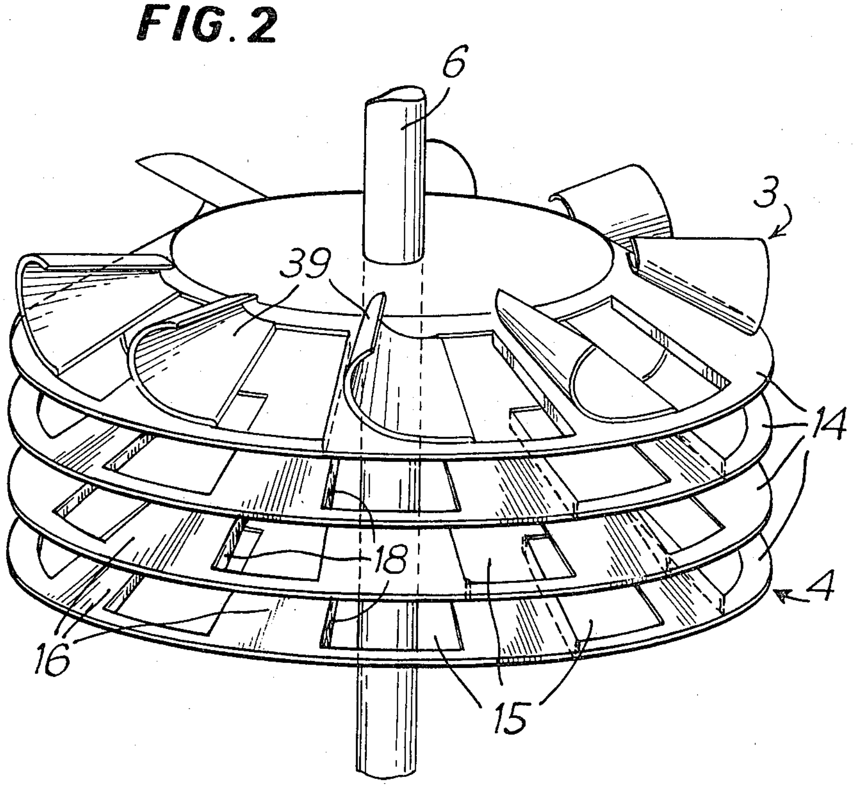
FIG. 2 is a partial perspective view similar to FIG. 1 and illustrating a second embodiment of the apparatus.

According to the embodiment shown in FIG. 1, the rotating element or rotor 4 is constituted by a stack of flat circular plates 13 and, according to the embodiment shown in FIG. 2, this rotor is constituted by a stack of truncated plates 14.

The means described hereinbelow with regard to the embodiment of FIG. 1, in which the generatrices of the plates 13 are straight and perpendicular to the axis of rotation, are obviously applicable to the embodiment of FIG. 2 and to others, in which the generatrices may be curved and, if they are straight or curved, concurrent with or out of true with respect to the axis of rotation with any angle of incidence. In other words, the plates may be regular surfaces, such as conical surfaces, or any balanced surfaces of revolution, which cannot constitute a major difficulty in execution since the plates may, due to the reduced stresses which they undergo, which the specification will demonstrate, be manufactured by moulding and even be in plastic material.

Figure 3:
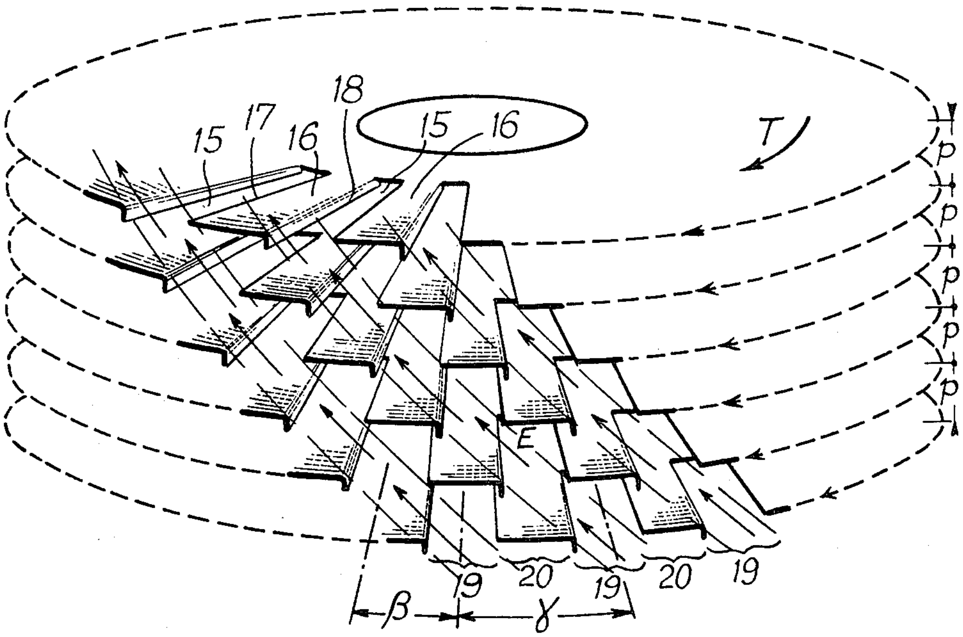
FIG. 3 is a very schematic view demonstrating, for a first embodiment of the rotor, the process of the invention.
Figure 5:
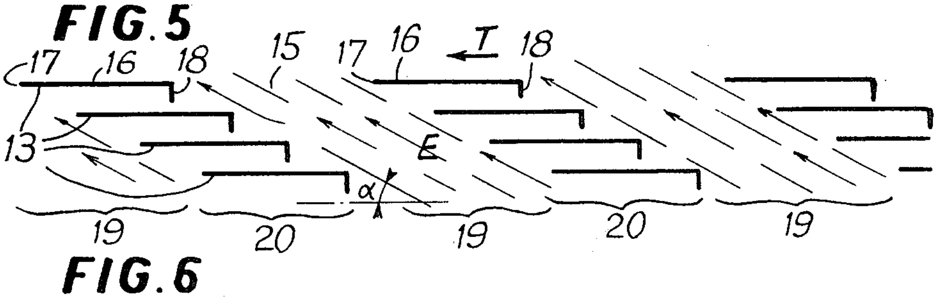

In the example with reference to FIGS. 1, 3 and 5, the plates 13 are spaced apart from one another at a constant pitch "p". Each plate 13 defines openings 15 distributed equiangularly, extending from the centre towards the periphery and separated by solid parts 16. In the example shown, each solid part marks by its front edge 17 and by its rear edge 18, with respect to the direction of rotation T of the plates, the limits of the two adjacent openings; as said limits are radial, said openings and said solid parts are trapezoidal in form.

It is essential to note that the plates 13 are offset angularly one with respect to the following or to the preceding, by an angle $\beta$ (FIG. 3) (with angle $\beta$ being in radian measure, that is, $2\pi$ radians equal 360°), so that the openings are no longer located opposite one another, but gradually define helical envelopes of privileged inclination "$\alpha$" with respect to the rotor (FIG. 5). Within such virtual envelopes, running helical streams 19 of the mixture to be treated flow, if they are rendered at suitable speed by the rotary distributor 5. Outside these virtual envelopes, still, helical fluid layers 20 stagnate or dwell with a low rate of renewal, maintained prisoner of the rotating element between the solid parts 16 of the plates.

According to the process of the invention, the rotor 4 thus constituted actually divides the mixture to be treated into a plurality of intermediate still helical streams 20. The running streams passing through this rotor following said helical paths, flow at an absolute tangential speed obviously greater than that of said rotor, whilst the still layers, being prisoner of the latter, circulate substantially at its tangential speed.

Under these conditions, it is observed that for a rotor rotating at the angular speed "$\omega$", the absolute tangential speed of a particle located at a radial distance R is:

$\omega R$ if this particle is in a still layer, $\omega R + V_T$ if this particle is in a running stream advancing with respect to the rotor at the relative substantially constant tangential speed "$V_T$".

Consequently, the centrifugal force of such a particle is:

$F_{CH} = \omega^2 R$ in a still layer and $$F_{CV} = \frac{(\omega R + V_T)^2}{R}$$

in a running stream

It is clear that the centrifugal force $F_{CV}$ in the running streams 19 develops in conical variation along the radii. It is minimum at a point where the relative tangential speed of the stream is equal to the absolute tangential speed of the rotor; at this point, the minimum centrifugal force is equal to $4\omega^2R$ and consequently to four times the centrifugal field which prevails on the circumference of the same radius in the still streams 20. The centrifugal force is very intense at the centre; it decreases up to the point where it reaches its minimum; then it increases again up to the periphery where it may reach extremely intense values.

This phenomenon, and the results set forth hereinafter which follow therefrom, are unforeseeable and unexpected in conventional centrifugation. Experimental facts based on the process and the apparatus of the invention corroborate the veracity of the results obtained.

In fact, it is verified that the heavy particles of the running streams 19 subjected to a very intense centrifugal force precipitate towards the periphery, decelerating and agglutinating before arriving at the annular zone of minimum force then, from this zone, accelerate again in greater masses towards the periphery. However, in the course of this centrifugal displacement, the heavy particles migrate, for various reasons set forth hereinafter, towards the still layers 20 in which they are picked up and trapped; they are then taken over by a centrifugal force, which is weaker but sufficiently high to guide them ineluctably towards the periphery in the course of this flow, trap elements and conducting elements, defined hereinafter, oppose the escape of the heavy particles towards the running streams and participate positively in their flow towards the periphery where they precipitate in the truncated rings 8 of the collecting element 7 which subtract them definitively from the mixture.

It is obvious that the angular offset "$\beta$" of the plates 13 and the spacing "P" thereof (FIG. 3), as well as the shape and dimensions of the openings 15 are chosen to determine with precision the relative inclination "$\alpha$" of the running streams 19 (i.e. their inclination with respect to the plates 13 when they rotate). The parameters in question therefore make it possible to regulate the separating power and the rate of flow of the apparatus. In general, these parameters are constant for a determined apparatus, but it may be advantageous to vary them from upstream to downstream as a function of the functioning of this apparatus and of the treatment to be obtained.

In any case, the choice of said parameters makes it possible, in relation with the running of the apparatus and the composition of the mixture, to define the privileged helical flow of the running streams 1 through the openings 15 of the rotor. Thus, each stream taking an opening "n" of the plate may continue its flow, passing through the homologous opening "n" of the following plate, i.e. the one offset downstream and at the front by the angle of offset "$\beta$" of the plates (FIG. 3); however, each stream may also miss out one or more openings, the following opening (n+1), (n+2) . . . then being offset downstream and at the front with respect to the reference opening "n" by an angle $(\beta+\gamma)$, $(\beta+2\gamma)$ . . . , $\gamma$ (with $\alpha$ being in radian measure) being the angular pitch of the openings on the same plate (FIG. 3).

The rotating element or rotor 4 functions in the manner set forth hereinabove, due to the presence of the rotary distributor 5; it is recalled that this distributor, by converting the upstream pressure drop into a helical speed of the mixture, directs the running streams of the latter towards the selected envelopes of the openings in the plates. Consequently, the relative speed of rotation of the streams due to this action is added in the same direction to the positive speed of rotation of the distributor which is that of the rotor.

According to the embodiment shown in FIGS. 1 and 11, the distributor 5 comprises a plate 13 with openings 15 and solid parts 16 offset in register with those of the plates of the rotor 4. This particular distributor is an impeller constituted by a plurality of vanes 21 whose concavity opens downwardly of the flow of the mixture in the direction of arrow E. The trailing edge 22 of each vane coincides with the edge 17 of the solid part 16 which defines the opening 15 in which the vane in question opens; moreover, this trailing edge 22 is inclined along the relative inclination "$\alpha$" of the running streams 19. Consequently, the vanes are advantageously fastened with at least certain of the solid parts, generally with all of them since they are preferably equal in number. The curvature of the concavity 23 and the shape of the leading edge 24 are established as a function of the aero- or hydrodynamic characteristics of the mixture and of the operating conditions.

The foregoing specification refers to the launching by the distributor 5 and to the helical guiding of the running streams 19 through the openings 15 of the rotor 4. The following specification now concerns the stabilisation of the still layers 20 in the helical intermediate spaces made between the solid parts 16 of the plates of the rotor, the picking up and trapping of the heavy particles coming from the running streams in the still layers, the positive guiding of the heavy particles trapped in the still layers towards the periphery.

To obtain these combined results, a plurality of embodiments, illustrated in FIGS. 4 to 10, may be employed.

Figure 4:
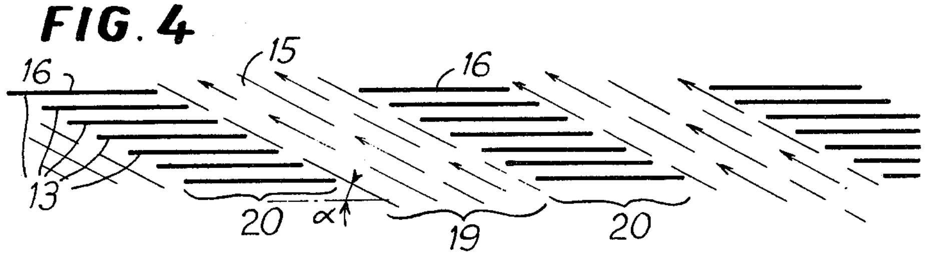

According to the simplified embodiment of FIG. 4, the plates 13 are smooth and very close to one another. As the mixture to be treated has a certain viscosity, at least the solid parts of the plates 13 have a surface state suitable for a certain adherence of this mixture, and as the flow E of said mixture is made at a sufficiently high speed to create a boundary opposing the remix of the contents of the still layers with the contents of the running streams, whilst allowing the heavy particles of the latter penetrate in said still layers, these still layers are really imprisoned between two consecutive solid parts 16. The heavy particles trapped in these layers are guided quite naturally through them under the effect of the centrifugal force of the rotor towards the periphery but cannot pass through the "skin" of the adjacent running streams in the opposite direction.

Such an embodiment (FIG. 4) is applicable to the separation of extremely fine particles, which may go as far as molecular separation.

When the plates 13 are spaced further apart from one another, for any reason, the results intended are obtained by providing protuberant elements, such as raised edges, ribs or the like, made fastened by any suitable means with the solid parts 16 of the plates. It is essential to note that these protuberant elements project solely in the still layers 20 and must not appear in the least in the running streams which they risk destroying or disturbing. Said protuberant elements cooperate with the solid parts 16 to maintain the still layers 20 prisoner of the rotor, to confine in these layers the heavy particles which escape from the running streams and to positively guide said particles towards the periphery.

Such protuberant elements are illustrated in FIGS. 5 to 10.

According to a first embodiment of this type shown in FIG. 5 and already evoked with reference to FIGS. 1 to 3, each solid part 16 of a rotor plate 13 comprises one marginal raised edge 18 which projects on the upstream face of this solid part (with respect to the flow E of the adjacent running streams 19) and to the rear (with respect to the rotation T of the plates).

Figure 6:
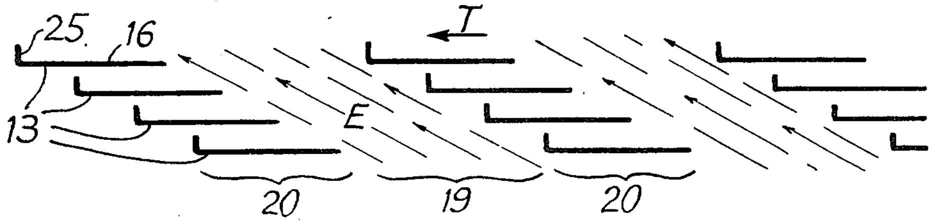

According to a second embodiment equivalent to the first and shown in FIG. 6, each solid part 16 comprises one marginal raised edge 25 projecting on the downstream face (with respect to the flow E of the running streams 19) and at the front (relatively to the direction of rotation T of the rotor).

According to a third embodiment combining the two preceding ones and shown in FIG. 7, each solid part 16 comprises a raised edge 18 projecting upstream to the rear and a raised edge 25 projecting downstream at the front.

FIGS. 5 to 7 show that the raised edges 18 and 25 may be perpendicular to the solid parts 16 of the plates. However, it is clear that they can be replaced, partly or totally, by inclined raised edges 18a and/or 25a (FIG. 9). The solid parts 16 of the plates 13 may also be bordered by inclined raised edges 18b and 25b (FIG. 10), of which the inclination is equal to the inclination "α" of the running streams with respect to the rotor.

According to the embodiment shown in FIG. 8, each solid part 16 of the plates may comprise at least one intermediate rib 26 and/or 27 projecting on its upstream face and/or on its downstream face in the corresponding still layers 20 and between the two adjacent openings.

The raised edges and ribs mentioned above, whether they are perpendicular or inclined, may be combined together in various arrangements, as long as there is no protuberance in the running streams and the existing protuberances retain the still layers prisoner, then trap and channel the heavy particles.

The foregoing specification relates to the shape of the stacked plates of the rotor 4. However, it is obvious that the rotary distributor may have a similar shape instead of the one with vanes described with reference to FIGS. 1 and 11. Simply by way of example, the rotary distributor may thus comprise at least two plates with any one of the sections of FIGS. 5 to 7 or at least one plate with the section of FIG. 10; in this case, the plates in question constitute the first stage of the rotor 4 assimilable to imaginary vanes.

The means employed for ensuring that the particles subjected to the very intense forces which prevail in the running streams 19 escape and migrate from these latter towards the still layers will now be set forth. Firstly, it is important to note that it is possible to reduce the length of travel of the heavy particles from the centre towards the periphery in a running stream 19, by modifying the shape of the cross-section of the stream in question, which cross-section depends on the shape and orientation of the openings which define the envelope of said stream.

Consequently, with reference to the embodiments illustrated in FIG. 13, the openings 15 may be, as indicated at:

- 28, trapezoidal windows whose large base is near the periphery and whose small base near the centre (shown in solid lines)
- 29, trapezoidal windows whose large base is, on the contrary, near the centre and whose small base is near the periphery (shown in broken lines),
- 30, narrow windows with substantially parallel edges (shown in dashed and dotted lines).

In all cases, the openings extend without interruption from the centre towards the periphery and are limited by rectilinear edges; however, it is obvious that the edges in question may be in zig-zag form or curved according to the law of trapping which appears necessary.

On the other hand and still with reference to FIG. 13, the openings may be radial (shown in dashed and dotted lines) or they may be inclined in rectilinear or curvilinear manner so that their peripheral end is in advance (shown in solid lines) or lagging (shown in broken lines) with respect to their central end, if their direction of tangential advance T is considered.

The foregoing examples show that the inclination, width and shape of the openings enables the time for collecting the heavy particle by the still layers to be determined with precision.

In certain cases, and particularly when the diameter of the plates is relatively large, it is advantageous to reduce the radial extent of the openings. To this end, and as shown in FIG. 14, openings 31 or 32 of small length are distributed in a plurality of concentric annular zones 33 to 36.

In the embodiment illustrated by the left-hand half of FIG. 14, the openings 31 are slots with parallel edges which present, from one zone to the following in the same plate, a substantially constant average width and spacing. The density of distribution of the running streams is substantially uniform and the time for collecting the heavy particles is reduced as a central deflector 37 extending the marginal raised edges 38 opposes the remix of the heavy particles escaping from the running streams of one annular zone with the running streams of the adjacent outer concentric zone; on the contrary, the deflectors in question direct the escaping heavy particles towards the still layers of the outer annular zone in question.

In the embodiment shown in the right hand half of FIG. 14, the openings 32 are trapezoidal windows which, from one zone to the following in the same plate, are located on common radii, whether they merge with the latter, or whether they form a positive or negative angle of incidence; the average width and spacing of these windows increases from the centre towards the periphery, on passing from one annular zone to the following one. As in the preceding case, the raised edges 38 of the windows present central deflectors 37 opposing the remix of the separated heavy particles.

It is obvious that the openings may be distributed in overlapping annular zones, in order to render their density more uniform and avoid the risks of remix.

On leaving the openings 15 of the last downstream plate of the rotor 4 the running streams 19 composed of the treated mixture containing no heavy particles, tend to continue their flow along the abovementioned helical paths.

Now, the process of the invention provides straightening up these helical flows to convert them at the outlet of the rotor 4 into an absolute axial flow towards the fan 2. Such an arrangement is particularly advantageous since the kinetic energy of rotation of this treated mixture may easily be recovered to rotate the coupled device 2, 4 and 5 and thus reduce the power consumed.

To this end, the last downstream plate of the rotor 4 is fast with the action turbine 3 whose section is adapted to the particular helical flows mentioned hereinabove for them to become substantially axial.

Figure 12:
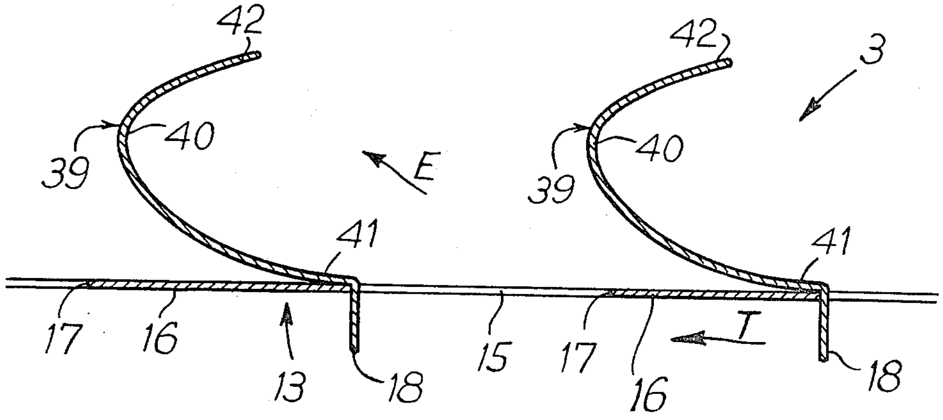

In the embodiment shown in FIGS. 1 and 12, the action turbine 3 comprises a plurality of vanes 39 of which the concavity 40 opens upstream of the flow of the mix in the direction of arrow E. The leading edge 41 of each vane coincides with the rear edge or raised edge 18 of the solid part 16 with which the vane in question is fast and which defines the opening 15 in which said vane opens; moreover, this leading edge 41 is inclined in the relative inclination $\alpha$ of the running streams 19. Of course, the curvature of the concavity 40 and the shape of the trailing edge 42 are established as a function of the aero- or hydrodynamic characteristics of the mix and the operating conditions.

Furthermore, the shape of the vanes 39 is such that they channel the residual traces of heavy phase towards the periphery where said vanes are open.

The foregoing specification shows that the aero- or hydrodynamic flow of the mix through the apparatus undergoes, between upstream and downstream, an increasing variation in speed; consequently, an expansion occurs quite naturally within the rotor and consequently a drop in temperature which may be used for condensing a vapour phase in the course of separation.

The invention is not limited to the embodiments shown and described in detail hereinabove, as various modifications may be made thereto without departing from the scope thereof.

The process and the apparatus forming the subject matter of the invention may be used for separating a mixture of phases of any states.

More particularly, they are applicable to the elimination of oily mists, such as those produced by machine tools, presses, certain heat treatment furnaces, to the elimination of solvent mists in baking ovens or in coating stations for example, to the elimination of aqueous mists possibly laden with lye and other toxic product, to the thorough washing of dust-laden gas with a small quantity of water . . . , to the extraction of trace of light liquid pollutant in aqueous phases such as residual water from oil refineries, to the thorough clarification of liquid phases laden with heavy pollutants . . . .

What is claimed is:

1. A process for centrifugal separation of a heavy phase from a light phase in a mixture comprising steps of:

providing a housing having an outlet and a plurality of apertured plates rotating therewithin;

offsetting the apertures in adjacent plates to define an inclination therebetween so that at least one uninterrupted helical path through the plates is defined and extends for a substantial length of said housing;

feeding a fluid mixture which is to undergo separation to the housing;

defining a boundary between said helical path and a zone outside said helical path which defines the profile of the helical path;

said zone being located between portions of the helical path and between portions of said plates;

rotating the plates and imparting an absolute tangential velocity to fluid flowing in said helical path and an absolute tangential velocity to fluid located in said zone, the absolute tangential velocity of the fluid in said helical path exceeding the absolute tangential velocity of the fluid in the zone, said absolute tangential velocity creating a helical path centrifugal force in said helical path and a zone centrifugal force in said zone, any heavy phase crossing said boundary and entering said zone being prevented from moving toward said housing outlet and being subjected to said zone centrifugal force to be moved radially outward of said plates to effect a zone centrifugal separation, and any heavy phase remaining in said helical path being subjected to said helical path centrifugal force which is higher than said zone centrifugal force to effect a helical path centrifugal separation, whereby a plurality of centrifugal separations are performed on said mixture;

fluidly connecting the zone with a heavy phase collecting means;

collecting the heavy phase in the heavy phase collecting means;

fluidly connecting the helical path with a discharge means; and discharging the light phase fluid flowing in the helical path from the housing.

2. The process of claim 1, further including a step of subjecting the mixture to an upstream drop in pressure.

3. The process of claim 1, further including steps of straightening the flow of the mixture at a downstream location into a flow directed axially of the housing, and recovering the kinetic energy of rotation of the treated mixture and using said recovered kinetic energy to rotate the rotating apertured plates.

4. A centrifugal separating apparatus for separating a heavy phase from a light phase in a mixture, comprising:

a housing having an outlet;

a rotatable shaft extending axially through said housing;

a plurality of apertured plates mounted on said shaft for rotation therewith, each plate having a plurality of apertures defined therein, the apertures in one plate being offset from corresponding apertures in adjacent plates to define an inclination therebetween to define a plurality of uninterrupted helical paths through said housing for a substantial length of said housing;

means for feeding a fluid mixture which is to undergo separation to the housing;

means for moving the mixture axially through said housing;

a boundary defining means for defining a boundary between each helical path and a zone outside the helical path to define the profile of said helical paths, said plates being spaced very close to one another, and said boundary defining means including plate edges which define said apertures, said zone being located between portions of said helical path and between said plates;

means for rotating said shaft at a velocity to impart an absolute tangential velocity to fluid flowing in said helical path and an absolute tangential velocity to fluid located in said zone, the absolute tangential velocity of the fluid in said helical path exceeding the absolute tangential velocity of the fluid in the zone, said absolute tangential velocities creating a helical path centrifugal force in said helical path and a zone centrifugal force in said zone, any heavy phase crossing said boundary and entering said zone being prevented by said plates from moving toward said housing outlet and being subjected to said zone centrifugal force to be moved radially outward of said plates to effect a zone centrifugal separation, and any heavy phase remaining in said helical path being subjected to said helical path centrifugal force which is higher than said zone centrifugal force to effect a helical path centrifugal separation whereby a plurality of centrifugal separations are performed on said mixture;

a heavy phase collecting means connected to said having; and a light phase discharge means connected to said housing and housing outlet.

5. The apparatus of claim 1, further comprising means for straightening out the flow of fluid discharged from the helical paths, said means also channeling residual traces of heavy phase towards the periphery of the housing.

6. The apparatus of claim 4, further including vanes attached to one plate to have a leading edge of each vane limiting the size of the apertures in this one plate.

7. The apparatus of claim 4, wherein the plates are oriented perpendicular to the axis of rotation of the shaft.

8. The apparatus of claim 4, wherein the plates are concave and truncated to converge downstream of the flow of the mixture.

9. The apparatus of claim 4, wherein the apertures of the plates are each bordered by a single raised edge projecting upstream of the mixture flowing through said housing and to the rear of said plate in rotation.

10. The apparatus of claim 4, wherein the apertures of the plates are each bordered by a single raised edge projecting downstream of said mixture flowing through said housing and at the front of said plate.

11. The apparatus of claim 4 including an action turbine located downstream of the plates and integral with the rotatable shaft, said action turbine comprising a plurality of concave vanes each oriented from the center thereof towards the periphery of the housing and whose concavity opens upstream with respect to the flow of the mixture, the leading edge of each vane being inclined with respect to the flow direction of the mixture.

12. The apparatus of claim 4, wherein protuberant elements are fastened to the plates and project into the second paths to be located on the edge of the helical paths and to confine the heavy phase in said second paths and to guide the heavy phase towards the periphery of the plates.

13. The apparatus of claim 12, wherein the apertures are inclined with respect to radii of the plates.

14. The apparatus of claim 4, wherein the apertures of each plate are located in a plurality of concentric annular area to render their density of distribution uniform and reduce the time for collecting the heavy phase in adjacent second paths.

15. The apparatus of claim 14, further including a central deflector mounted on the plates adjacent each aperture and wherein each aperture is defined to present at least one lateral edge extended by the central deflector into a zone, these projecting elements opposing the return into suspension in the helical streams of the heavy phase.

16. The apparatus of claim 15, wherein the apertures are slots which are defined to present a substantially constant average width and spacing from one area to the following in the same plate.

17. The apparatus of claim 15, wherein the apertures are trapezoidal in shape and which, from one area to the following in the same plate, are aligned on common radii, the average width and spacing of these apertures increasing from the center to the periphery of the plate from one area to the following.

18. The apparatus of claim 4, wherein the apertures of the plates are each bordered by two raised edges with one edge projecting upstream of the mixture flowing through said housing and to the rear of said plate in rotation and the other edge projecting downstream of said mixture and at the front of said plate.

19. The apparatus of claim 18, wherein the raised edges or blades are substantially perpendicular to the plate to which they belong.

20. The apparatus of claim 18, wherein the raised edges are inclined.

21. The apparatus of claim 4, including an impellar located upstream of the plates and integral with the rotatable shaft, said impellar including a plurality of concave vanes oriented from the center towards the periphery of the housing and whose concavity opens downstream with respect to the flow of the mixture, the trailing edge of each vane being inclined with respect to the flow direction.

22. The apparatus of claim 21, further including a disc coupled to the impellar and means for rotating the impellar, and wherein the vanes include trailing edges which are fastened with the disc to define openings in this disc to the rear with respect to the rotation of said impellar.

* * * * *